Feb. 26, 1957     E. NORMAN     2,782,920
TOOL MOUNTING MEANS FOR BILLET EXTRUSION PRESSES
Filed July 1, 1952     2 Sheets-Sheet 1
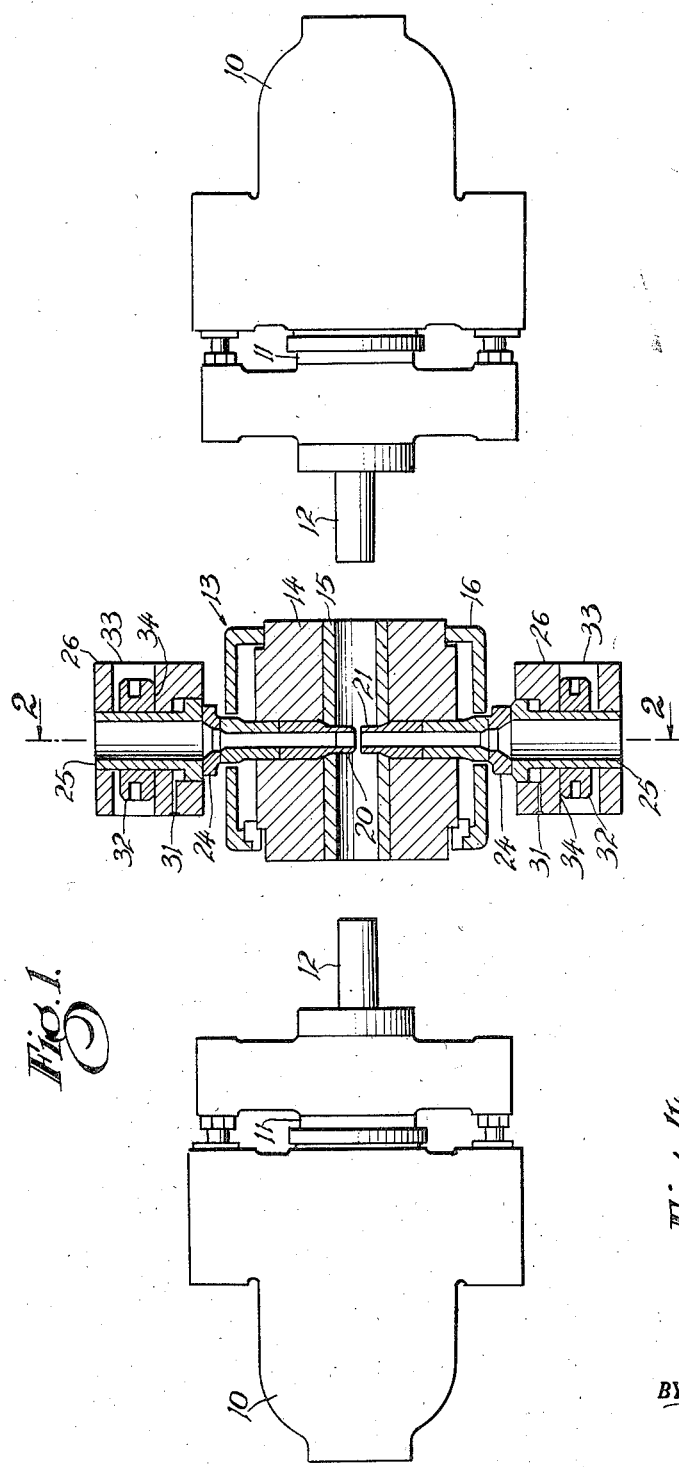
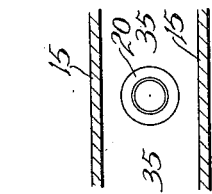
INVENTOR.
ERIC NORMAN
BY
Pollard and Johnston
ATTORNEYS Feb. 26, 1957 E. NORMAN 2,782,920
TOOL MOUNTING MEANS FOR BILLET EXTRUSION PRESSES
Filed July 1, 1952 2 Sheets-Sheet 2

INVENTOR.
ERIC NORMAN
BY
Pollard and Johnston
ATTORNEYS

United States Patent Office 2,782,920
Patented Feb. 26, 1957

2,782,920

TOOL MOUNTING MEANS FOR BILLET EXTRUSION PRESSES

Eric Norman, Bournemouth West, England, assignor to The Loewy Engineering Company Limited, London, England, a corporation of Great Britain Application July 1, 1952, Serial No. 296,686

Claims priority, application Great Britain July 4, 1951

4 Claims. (Cl. 207—4)

In billet extrusion presses for the manufacture of hollow articles, the wall thickness of the extruded article is determined by the width of the gap between die and mandrel, the latter being frequently called "the core" in the case of extrusion presses for cable sheathings. The present invention relates to means for mounting the die and the mandrel or core in a billet extrusion press which, for the sake of brevity, will be referred to in the following as "the tools."

In certain types of presses, the tools and any accessories thereof, such as holders or adaptors, arranged in their axis, form units of substantial length which, however, are anchored to a stationary part of the press at their roots only. This arrangement is to be found particularly in radial extrusion presses in which the billets are so positioned in the container of the press that they protude radially into the container bore from opposite directions, their ends facing each other.

Whilst extrusion is in progress, the tools are exposed to strong endwise pressure and tools or tool units with the afore-mentioned characteristics are likely to suffer elastic deformations which will make them shorter. Conversely, as soon as the pressure on the tools is relaxed, they tend to resume their original length. The gap between the tools will therefore become wider as soon as extrusion begins and will contract to its original width upon cessation of extrusion pressure.

The changes in the width of the extrusion gap, occurring in this way, were often considerable and apt to lead to the extrusion of hollow articles which, at least for part of their length, were too thin or too thick. This was a serious drawback, as according to present demands, the wall thickness of an article must be kept within close tolerances. Changes in the width of the extrusion gap made themselves particularly felt in the case of articles which were continuously extruded from a series of billets, fed into the container in succession, as this mode of operation necessitated a temporary relief of the extrusion pressure each time a fresh billet was fed into the container; on each such occasion the extrusion gap, whilst still being filled with metal, underwent a contraction, so that continuously extruded articles were often found to show over their entire length a regularly recurrent pattern of deformations in the shape of radial restrictions.

It was formerly proposed in a radial extrusion press to provide back-stops at the rear of each tool unit against which the unit was forced by the extrusion pressure, the back-stops being adjustable. Such an arrangement is described in co-pending patent application Serial No. 296,685, filed July 1, 1952. In this way, the tool units were firmly held against outward movement and any inward movement was prevented by the extrusion pressure itself. However, as the back-stops were not resilient, they could not prevent elastic deformation of the tool or tool units, nor could they be moved in opposition to the extrusion pressure, which made their adjustment during operation of the press impossible.

It is an object of the present invention to provide a billet extrusion press and, in particular, means for mounting the tools of such a press, which are free from the above-described shortcomings.

According to the present invention, at least one of the tools or tool units of a billet extrusion press has a back-stop which is normally resilient and can yield to an outwardly directed displacement of the tool or tool unit, but which during the time that the tools are under extrusion pressure, is subjected to an inwardly directed pressure, preventing any outward displacement of the tool or tool unit.

This pressure is preferably applied to the back-stop in the form of hydraulic pressure, the back-stop being then movable like a piston in a chamber which can be filled with fluid under pressure at the same time the extrusion pressure is applied to the tools and from which pressure fluid can be exhausted upon cessation of extrusion pressure.

This arrangement makes it possible for a tool to regain its original length, upon cessation of the extrusion pressure, by stretching itself towards the back-stop as the latter can recede. The stretching will therefore take place in a direction away from the extrusion gap, and the latter will maintain its width unchanged under all operational conditions of the press, whether extrusion is in progress or not.

The pressure chamber for the back-stop may be formed in a stationary supporting member in which the back-stop is guided and may be connected directly to the main cylinder of the press which actuates the extrusion or pressing stem. In this way, the admission of pressure fluid to the chamber and its exhaust therefrom will be automatically synchronized in a very simple manner with the building up and relief of extrusion pressure.

The above described arrangement of the pressure chamber makes it possible to provide means for the easy and accurate positional adjustment of such a back-stop, and thereby also of the protrusion of the tools into the container bore, which means are operable while extrusion is in progress. To this end, the back-stop may carry an adjustable stroke-limiting member, which may be in the form of a nut threaded onto an extension of the back-stop. This member is adapted to make contact with an inner seat provided on the above-mentioned stationary supporting member. Small variations in the protrusion of the tools can therefore be accomplished by altering the position of this element relative to the back-stop.

From the foregoing, it should be noted that the back-stop needs to have only a very limited stroke as the variations in the protrusion of the tools which are to be effected in the afore-described manner are of a comparatively small order.

With the above-described arrangement, stretching of a tool towards the extrusion gap is theoretically eliminated. However, in practice the possibility of a tool displacing itself towards the extrusion gap for one reason or another cannot be entirely excluded, and as the gap is in practice very narrow, there is a certain risk of its becoming closed altogether, which would have detrimental consequences.

To avoid this, one or both of the tools are provided on their faces, according to a further feature of the invention, with projections in the form of pads or the like, which separate the tools from each other by a minimum distance.

An embodiment of the invention will now be described by way of example with reference to the accompanying drawings in which:

Fig. 1 is a plan view of a radial extrusion press, partly in section, incorporating tool supporting means according to the invention.

Figs. 4a and 4b show in section and plan view respectively a modification of a detail of the extrusion tools.

Figure 2:
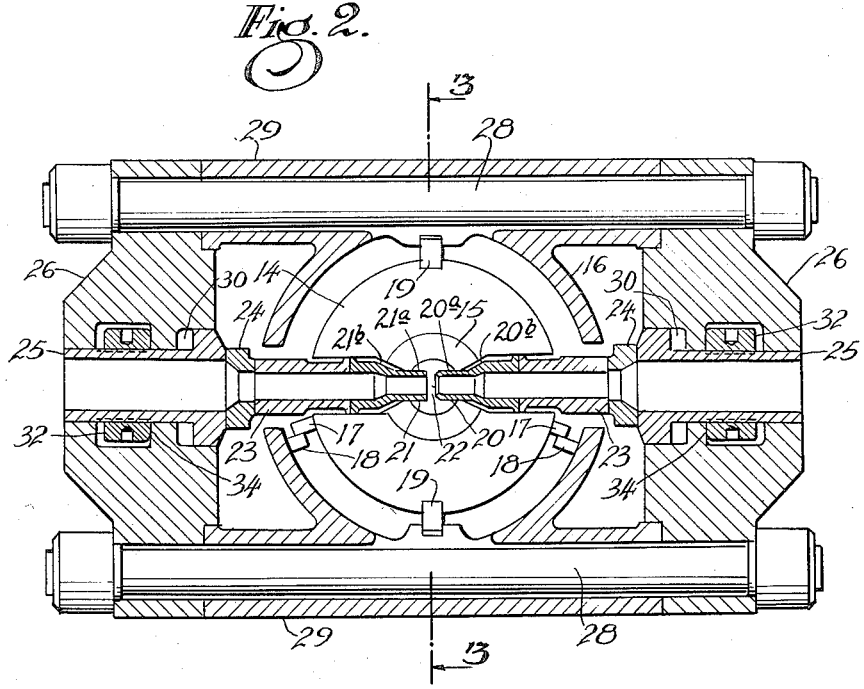
Fig. 2 is a section through the container assembly of the press of Fig. 1 at a larger scale along line II—II of Fig. 1.
Figure 3:
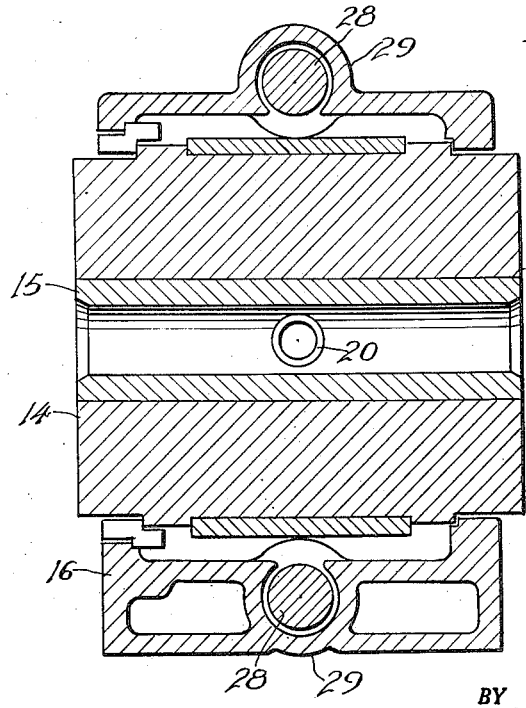
Fig. 3 is a section through the container assembly along the line III—III of Fig. 2.

The invention is shown in the drawings as being applied to a radial extrusion press of the double-acting type in which the container has a through bore and can therefore be fed with billets at both its ends. The press comprises accordingly two separate main hydraulic cylinders 10, one at each side of the container assembly, the cylinders having rams 11 to which pressing or extrusion stems 12 are attached. This part of the press may be of any suitable and conventional design and need, therefore, not be described in detail.

The container assembly, generally designated by the numeral 13, comprises the billet container proper 14, preferably fitted with a liner 15 of special steel, and a container holder 16. Heating means of any appropriate type, not shown here, are preferably provided in the annular space between the container 14 and its holder 16. The container 14 rests on the holder by means of radial ribs 17, 18 and is held in correct alignment with the other parts of the press by means of a further rib 19 (Fig. 2).

The tools of the press include a tubular mandrel or core 20 and a tubular die 21. The tools are mounted in the radial crossbores in the container and are freely slidable therein. As shown in the enlarged scale drawings of Fig. 2, the tools are spaced from the container so as to permit expansion and contraction of the container 14 and liner 15 without disturbing the adjustment of the tools 20 and 21. The tools are provided with reduced cylindrical end portions 20a and 21a which have a close sliding fit in the cylindrical openings in the liner 15 and are provided with tapered shoulders 20b and 21b back of the openings through the liner 15. The tapered shoulders 20b and 21b are spaced from the container and liner to permit the expansion of the container and liner relative to the tools without disturbing the tool adjustment and to permit movement of the tools relative to the container and liner for the purpose of adjustment and for the purpose of relieving elastic deformation of the tools without changing the thickness of the gap between the tools during billet charging operations. The press, which is shown by way of example in the drawings, is destined for the extrusion of cable sheathings from solid billets, and the tool 20 is therefore hollow, in order to form a passageway for the unsheathed portion of the cable. It is to be understood that the invention is equally applicable to extrusion presses for other hollow articles than cable sheathings, such as ordinary tubes or hollow sections, in which case, the part 20 will be formed by a solid mandrel. The tools are so positioned in the container 14 that they protrude radially into the bore from opposite directions, their ends facing each other with a narrow gap being left between them at 22, through which the extruded metal enters the die. The width of the gap 22 determines the thickness of the extruded hollow article.

Arranged at the rear of each of the tools 20 and 21 are adaptor sleeves 23 (Fig. 2), as well as distance pieces 24 in the form of rings. As aforesaid, the tools together with their associated parts 23 and 24, form together units which are arranged in cross-bores of the container assembly 13 in such a way that they are free to be displaced in their axial direction.

Provided at the end of each such unit is a hydraulically operated back-stop 25 having a flange at its end near the distance ring 24 which is acted upon by pressure fluid contained in a chamber 30. In this way, an inwardly directed pressure will be exerted on both tool units in opposition to the outwardly directed pressure, to which the units are subjected during the extrusion operation, and the tools 20 and 21 will be held in their preadjusted position whilst extrusion is in progress. Pressure fluid is supplied to the chambers 30 through conduits 31 (Fig. 1) which are connected to an outer source of pressure fluid supply. It is preferable, for reasons which will become apparent below, to use the same source of pressure fluid supply which feeds the main hydraulic cylinder 10 of the press.

The back-stops 25 are arranged in the centre of crossheads 26 in which also the fluid pressure chambers 30 are provided. The crossheads are connected to each other by means of tie-rods 28 which pass through tubular extension 29 on the container holder 16. This latter arrangement is described more in detail in co-pending patent application Serial No. 296,685, filed July 1, 1952.

Threaded to each of the back-stops 25 is a nut 32 accommodated in a recess in the crossheads 26 and accessible from outside by suitable apertures 33 in the crossheads 26 (Fig. 1). In this way, the nuts 32 can be readily manipulated, if and when desired.

The nuts 32 serve as stroke-limiting elements for the tool units and thus determine their protrusion into the container bore. To this end, and inner seat 34 is provided at one side of both apertures 33 with which the nuts 32 co-operate in a manner presently to be described.

Fluid pressure in chamber 30 is directed inwardly and will thus move nut 32 towards its inner seat 34. Conversely, pressure exerted on the tools 20 and 21 by the metal inside the container is directed outwardly and will move nut 32 outwards. Normally during an extrusion operation, the pressure in the chamber 30 is made strong enough to overcome the outwardly directed pressure on the tool units, and the nuts 32 will therefore be in contact with their seats 34.

The above-described device will be operated in the following manner:

Prior to extrusion, a preliminary adjustment of the nuts 32 is made so that the tools 20 and 21 protrude such a distance into the container bore as will result in an extrusion gap which would produce articles of the correct wall thickness, under the assumption that the tools would not shrink under extrusion pressure. Extrusion of billets under full pressure will then be started. At the same time, the chambers 30 will be filled with pressure fluid, by reason of their connection with the main cylinders 10 of the press. Under extrusion pressure, the tools 20 and 21 will be liable to undergo elastic deformations and to become shorter whereby the gap 22 will widen. This will become manifest by an increase in the thickness of the extruded article.

In order to compensate for this increase, a restriction of the gap 22 has to be effected. This is achieved by moving one of both of nuts 32 in an outward direction so that there will be temporarily a small clearance between the nut or nuts and the seats 34. This clearance will, however, disappear presently as the back-stops 25, and thereby the tool units, will be advanced inwardly under the pressure in the chambers 30.

If, on the other hand, the extruded hollow article should be too thin, the required increase in the width of the gap 22 can be effected by first releasing the pressure from the chambers 30, whereupon the tools and back-stops will be moved outwardly under the pressure of the metal inside the container. The nuts 32 will then be moved inwardly the required distance, and the pressure in the chambers 30 re-established. Release of pressure in the chambers 30 is achieved by stopping pressure to main cylinder 10 and then slightly exhausting pressure fluid from them and thus from chambers 30.

As soon as extrusion of a billet is terminated, the pressure in the main cylinders 10, and thereby also in the chambers 30, will be relieved. The back-stops 25 are therefore free to recede, and the tools 20 and 21 to stretch in a direction away from the extrusion gap. The width of the gap will therefore remain substantially unchanged, independent of whether the metal in the container is under pressure or not.

This is of particular importance in the case of continuously extruded hollow articles which are built up from a series of billets fed in succession to the press, as this mode of operation necessitates a temporary interruption of the extrusion pressure whilst the extrusion gap is filled with metal. Continuously extruded articles will therefore remain free from any local reduction of their wall thickness.

The pressure fluid chamber 30 may be directly connected to the main cylinders 10 of the press, as mentioned before, so that any variations in the pressure in the main cylinders will automatically be imparted to the chambers 30. In some instances it may be an advantage to operate the chambers 30 at a somewhat reduced specific pressure, in which case, suitable pressure-reducing devices of any known type are installed in the fluid supply lines leading to these chambers.

In those cases where the pressure fluid is supplied to the main cylinder or cylinders of the press from a hydraulic accumulator, an alternative connection, not shown here, may be provided between the chambers 30 and the accumulator, suitable control valves being arranged for selectively connecting the chambers to either the cylinders or the accumulator. The latter connection enables the back-stop to be moved back and forth by short distances independently of the pressing stems 12; this may be found to be useful in some instances, for example, for the purpose of loosening the tools in case they have become firmly embedded in the billet metal.

As shown in Figs. 4a and 4b, one of the tools is provided on its face with projections in the form of pads 35 which separate the two faces by a minimum distance and prevent the extrusion gap 22 from being closed altogether by accident. The pads 35 are preferably arranged at those points of the extrusion gap where the billet metal is most ready to flow, so that they prevent concentration of the metal at those parts, and achieve a uniform distribution of the metal around the circumference of the gap.

In the embodiment shown here, both tools 20, 21 are provided with hydraulic back-stops 25. Satisfactory results can be obtained also in cases where only one of the tools is provided with a hydraulic back-stop, while the other tool is rigidly held in a supporting member such as a crosshead 26. In this instance, the rigidly mounted tool will, after cessation of extrusion pressure, stretch towards the extrusion gap and in doing so push before it any metal contained in the gap. This, in turn, will cause an outward displacement of the other tool which, after release of fluid pressure can give way in an outward direction. The hydraulic back-stop of this latter tool will thus be outwardly displaced on the cessation of extrusion pressure by a distance equivalent to the total elongation of both tools.

The invention has been described here in connection with a radial extrusion press. It is, however, to be understood that it is also applicable to straight-through extrusion presses.

The invention is capable of further modifications and is not limited to the embodiment shown.

What is claimed is:

1. A billet extrusion press, including spaced crossheads, a billet container holder between said crossheads, means clamping the crossheads and the billet container holder together as a rigid unit, a billet container, means mounting said billet container for radial expansive movement in said holder, axially aligned and opposed hollow extrusion tools extending from said crossheads toward each other, said billet container having a main bore, said billet container having opposed radial crossbores for the slidable reception of said extrusion tools, the ends of said tools being located in the main bore of said billet container so as to form an extrusion gap between the ends of said tools, means to adjust said tools from said crossheads to fix said extrusion gap, including adjustable cooperating stop means on said crossheads and said tools to stop the inward movement of said tools, and fluid pressure means acting between said crossheads and said tools to force said cooperative adjustable stop means into engagement, said fluid pressure adapted to be regulated in accordance with the pressure of the extrusion operation to provide a substantially constant extrusion gap.

2. A billet extrusion press, including spaced crossheads, a billet container holder between said crossheads, means securing the crossheads and the billet container holder together as a rigid unit, a billet container, means mounting said billet container for radial expansive movement in said holder, axially aligned and opposed hollow extrusion tools extending from the crossheads toward each other, said billet container having a main bore, said billet container having opposed radial crossbores for the adjustable reception of said extrusion tools, the ends of said tools being located in the main bore of said billet container so as to form an extrusion gap therebetween, means to adjust the position of said tools from said crossheads to fix said extrusion gap, including adjustable cooperating stop means on said crossheads and said tools to stop the inward movement of said tools, and fluid pressure means acting between said crossheads and said tools to force said cooperative adjustable stop means into engagement, said fluid pressure adapted to be regulated in accordance with the pressure of the extrusion operation to provide a substantially constant extrusion gap.

3. A billet extrusion press constructed in accordance with claim 1, wherein said fluid pressure means include pressure chambers in said crossheads, passages in said crossheads for communication with the pressure of the extrusion operation and opening into said pressure chambers, piston heads provided on said tools and entering into said pressure chambers to close said chambers; and wherein said means to adjust said tools consist of a nut threadedly connected to each of said tools, and a recess in each of said crossheads housing each nut; and, wherein said adjustable cooperating means consist of a wall of said recess and a wall of said nut.

4. A billet extrusion press constructed in accordance with claim 2, wherein said fluid pressure means include pressure chambers in said crossheads, passages in said crossheads for communication with the pressure of the extrusion operation and opening into said pressure chambers, piston heads provided on said tools and entering into said chambers to close said chambers; and wherein said means to adjust said tools consist of a nut threadedly connected to each of said tools and a recess in each of said crossheads housing each nut; and, wherein said adjustable cooperating means consist of a wall of said recess and a wall of said nut.

References Cited in the file of this patent

UNITED STATES PATENTS

| | | |
|---|---|---|
| 1,011,522 | Summey | Dec. 12, 1911 |
| 1,109,555 | Summey | Sept. 1, 1914 |